United States Patent
Csatári

(10) Patent No.: US 10,563,061 B2
(45) Date of Patent: Feb. 18, 2020

(54) POLYMER BLEND AND POLYMER AGGLOMERATE CONTAINING RECYCLED MULTILAYER FILM WASTE AND FIBER REINFORCED PLASTIC WASTE AND PROCESS FOR PREPARING SAID AGGLOMERATE

(71) Applicant: JÁGER INVEST KERESKEDELMI, SZOLGÁLTATÓÉS INGATLANHASZNOSÍTÓ KFT., Nemesvámos (HU)

(72) Inventor: László Csatári, Felsőörs (HU)

(73) Assignee: JAGER INVEST Kereskedelmi, Szolgáltatóés Ingatlanhasznosító Kft., Nemesvámos (HU)

( * ) Notice: Subject to any disclaimer, the term of this patent is extended or adjusted under 35 U.S.C. 154(b) by 0 days.

(21) Appl. No.: 15/313,607

(22) PCT Filed: May 21, 2015

(86) PCT No.: PCT/HU2015/000048
§ 371 (c)(1),
(2) Date: Nov. 23, 2016

(87) PCT Pub. No.: WO2015/177580
PCT Pub. Date: Nov. 26, 2015

(65) Prior Publication Data
US 2017/0174883 A1 Jun. 22, 2017

(30) Foreign Application Priority Data
May 23, 2014 (HU) .................... 1400262

(51) Int. Cl.
C08L 77/00 (2006.01)
C08J 11/04 (2006.01)
C08L 67/00 (2006.01)
C08K 7/14 (2006.01)
C08L 23/12 (2006.01)
C08K 5/1539 (2006.01)
C08K 7/04 (2006.01)
C08J 3/20 (2006.01)
C08J 5/00 (2006.01)
C08J 11/06 (2006.01)
C08J 11/12 (2006.01)
C08K 13/06 (2006.01)
C08L 23/00 (2006.01)

(52) U.S. Cl.
CPC ............... *C08L 77/00* (2013.01); *C08J 3/20* (2013.01); *C08J 5/00* (2013.01); *C08J 11/04* (2013.01); *C08J 11/06* (2013.01); *C08J 11/12* (2013.01); *C08K 5/1539* (2013.01); *C08K 7/04* (2013.01); *C08K 7/14* (2013.01); *C08K 13/06* (2013.01); *C08L 23/00* (2013.01); *C08L 23/12* (2013.01); *C08L 67/00* (2013.01); *Y02P 20/143* (2015.11); *Y02W 30/70* (2015.05)

(58) Field of Classification Search
None
See application file for complete search history.

(56) References Cited

U.S. PATENT DOCUMENTS

| | | | |
|---|---|---|---|
| 5,719,198 A | 2/1998 | Young et al. | |
| 7,994,241 B2 * | 8/2011 | Joyce | C08L 97/02 |
| | | | 524/13 |
| 8,450,382 B2 | 5/2013 | Riise et al. | |
| 2004/0024119 A1 | 2/2004 | Wang | |
| 2008/0045102 A1 | 2/2008 | Keep | |
| 2008/0213572 A1 | 9/2008 | Halahmi et al. | |
| 2008/0227914 A1 | 9/2008 | Peng | |
| 2010/0216902 A1 * | 8/2010 | Wendelin | B29B 17/0412 |
| | | | 521/47 |
| 2014/0024778 A1 | 1/2014 | Alsewailem et al. | |

FOREIGN PATENT DOCUMENTS

| | | |
|---|---|---|
| EP | 1 563 007 B1 | 8/2005 |
| EP | 2 682 421 A1 | 1/2014 |
| HU | 226636 B1 | 5/2009 |
| RU | 53 330 U1 | 5/2006 |

* cited by examiner

*Primary Examiner* — Ana L. Woodward
(74) *Attorney, Agent, or Firm* — Jason F. Voight

(57) ABSTRACT

The invention relates to the recycling of polyamide and polyolefin wastes and fiber reinforced plastic wastes. Particularly, the invention relates to polymer blends and homogenous polymer agglomerates containing polyamide and polyolefin wastes or co-extruded film wastes and glass fiber reinforced plastic wastes, and to a single-stage continuous process for the preparation of said agglomerate. The invention also relates to products containing the aforementioned substances.

5 Claims, 1 Drawing Sheet

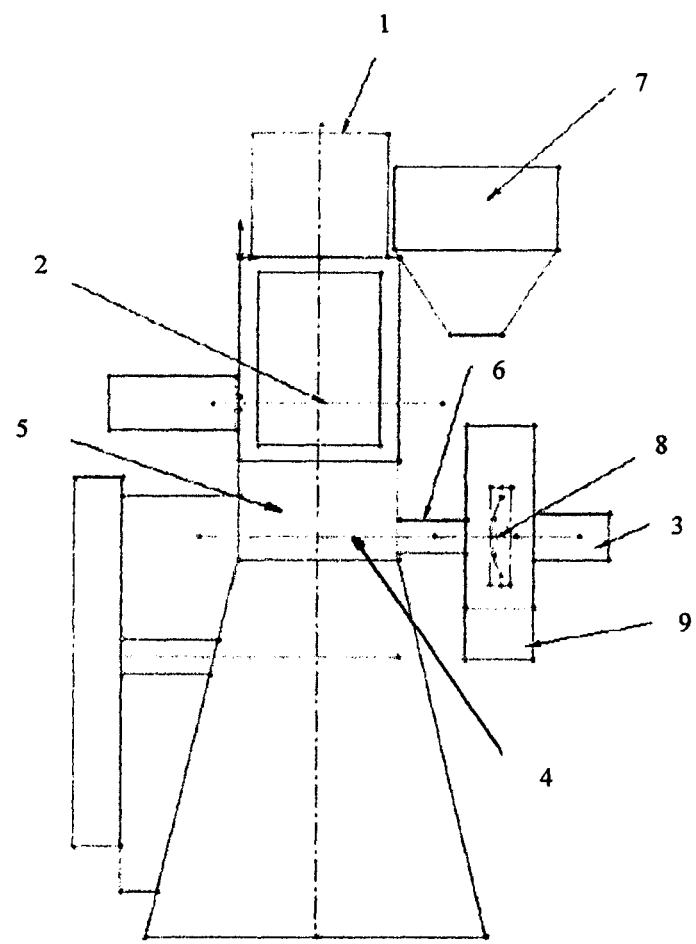

POLYMER BLEND AND POLYMER AGGLOMERATE CONTAINING RECYCLED MULTILAYER FILM WASTE AND FIBER REINFORCED PLASTIC WASTE AND PROCESS FOR PREPARING SAID AGGLOMERATE

This is the national stage of International Application PCT/HU2015/000048, filed 21 May 2015.

FIELD OF THE INVENTION

The invention relates to the recycling of polyamide and polyolefin wastes and fiber reinforced plastic wastes. Particularly, the invention relates to polymer blends and homogenous polymer agglomerates containing polyamide and polyolefin wastes or co-extruded film wastes and glass fiber reinforced plastic wastes, and to a single-stage continuous process for the preparation of said agglomerate. The invention also relates to products containing the aforementioned substances.

BACKGROUND OF THE INVENTION

The packing industry produces composite packaging materials having two or more, e.g. even fourteen layers for different applications, e.g. for packaging thermosetting fiber reinforced resins (pre-preg), food products and medicaments. From among these packaging materials with two-seven layers typically contain different polymer films wherein the aroma seal and the adhesion between the films are provided by a special oligomer film. These films are usually produced through the high-investment blown co-extrusion technology from polyamide (PA) and polyolefin films, characteristically from polypropylene (PP) films having a layer with excellent barrier property, such as ethylene vinyl alcohol (EVOH) film between them. Hereinafter these are called co-extruded films.

The waste management of the above waste packaging materials raises several problems. Their recycle may cause difficulties if they become contaminated with the residues of packaged materials, such as pre-preg. On the other hand, in co-extruded films the different polymer components are glued together. These components are usually hydrophilic polyamides and hydrophobic polyolefins, which are not compatible with each other and there is a 40-50° C. difference between their processing temperatures. Thus, the conventional compounding methods are not suitable for their homogenization, and their separation is not feasible even if the most advanced technologies are used.

A further problem is that the water absorption of polyamide can reach up to 3-5% by weight of polyamide and moisture should be removed during production otherwise polyamide will become unprocessable. However, water removal requires a lot of energy input. In view of the above, these film wastes are utilized primarily as inert filling materials.

Moreover, in Europe there is a widespread tendency to utilize them as energy materials, i.e. fuels, which is, however, in contradiction with the efforts to give preference to the reuse of waste materials in order to spare the Earth's resources. This is particularly true regarding materials produced by using high specific energy, such as co-extruded films.

One of the well-known methods of recycling polyamide/polyolefin film wastes is compounding them in a double-screw extruder, during which the wastes are melted, property-enhancing additives are introduced into them, then they are "kneaded" to obtain homogeneous material, after that the obtained material is granulated. Due to the high melting point of polyamide, this process should be performed at a temperature around 250° C., however the processing temperature of polyolefins is only 190° C. and at temperatures higher than this, polyolefins become highly degraded. Furthermore, any extra heat transfer step taken during the process leads to the partial degradation and property impairment of the polyolefins.

According to another process, polymers are separated on the basis of their density. Essentially, in this process a magneto-hydrostatic fluid is created and the phases with different fluid densities, formed in the process, are separated. By using this process, the polyolefins, polystryrene (PS), acrylonitrile butadiene syterene copolymers (ABS) and polyamide can be separated, however this process is not appropriate for separating the co-extruded film or an agglomerate containing it.

Hungarian Patent Application No. P0301987 (ExxonMobil Chemical Partners Inc.) describes thermoplastic polymer blends which contain only hydrophyl-hydrophyl end-groups, therefore, in their case the problem of homogenizing the hydrophylic-hydrophobic mixtures does not occur.

In Hungarian Patent No. 226 636 (Appl. No. P0500317) a vibration and noise reducing nano and micro composition of wide frequency range was produced from thermoplastic polymers by the recycle of tyre rubber powder. In this process the components were compatibilized by the use of ethylene vinyl acetate copolymer (EVAC).

European Patent No. EP1563007 (validated in Hungary under No. E001500) relates to products prepared from polymers not compatible with each other. According the disclosure, polymer tubes and inserts were produced by mixing melts of polyolefin, polyamide and a compatibilizing agent. Alkyl-carboxyl-substituted polyolefins were used as compatibilizing agent prepared by grafting carboxylic acids, anhydrides or esters to polyolefins.

The invention relates to the co-recycling of polyamide and polyolefin plastic wastes, such as film wastes or co-extruded film wastes, with fiber reinforced plastic or resin wastes. The aforementioned wastes are produced with high energy inputs, therefore, they imply high added value, furthermore, they possess excellent physical-mechanical properties, this is the reason why possibilities of their reuse were investigated.

The present inventor discovered that the addition of dicarboxylic acid anhydrides to the mixture of the above wastes can solve the problem of homogenizing the non compatible polyamide and polyolefin film wastes and the homogenization of co-extruded films containing polyamide and polyolefin layers, and additionally the incorporation of fiber containing wastes can be promoted. For the improvement of the properties of the product, further polymer materials can be added. These can also be waste materials, the recycling of which provides a solution to the management of further polymer wastes.

As a result of the present process a homogenous disperse polymer agglomerate is obtained, by the use of which as a base material, plastic products with excellent properties and with fiberglass-free surface are produced.

SUMMARY OF THE INVENTION

The invention relates to polymer blends suitable for the preparation of homogenous polymer agglomerate, which polymer blend comprises polyamide, polyolefin, glass fiber reinforced plastic and/or resin and a small molecular compatibilizing additive as components, and compatibilizing polymers and/or property-modifying polymers as optional components, and optionally other additives commonly used in plastics industry.

In one embodiment, any components of the polymer blend according to the invention may be waste materials, and preferably most of the components are waste materials.

In one embodiment, polyamide and polyolefin components are in the form of waste granules, e.g. in the form of waste film granules, preferably in the form of co-extruded waste film granules, and the fiber reinforced plastic and/or resin components are present in the form of waste SMC grinds and/or cross-linked pre-preg; the small molecular compatibilizing additve component is a dicarboxylic acid anhydride, preferably maleic acid anhydride; the compatibilizing polymer component is a thermoplastic material chosen from the group comprising PP EPDM elastomer, ethylene butyl acrylate copolimer and ethylene vinyl acetate copolymer, but preferably, it is a PP EPDM elastomer; the property modifying polymer component is e.g. a polyolefin, such as polyethylene or EPDM or TPU; and the other additive components commonly used in plastics industry are e.g. colorants, flow-improving additives, antistatics, blowing agents, calcium carbonate, talc or silica.

In one embodiment, the main component of the polymer blend according to the present invention is co-extruded film waste comprising
- 40-49% by weight polyamide,
- 49-58% by weight polyolefin, and
- optionally about 2% by weight EVOH, and the other components, related to the total weight of components, are
- 1-5 of % by weight small molecular compatibilizing additive,
- 0-10 of % by weight fiber reinforced plastic waste,
- 0-20% by weight compatibilizing polymer and/or property modifier polymer, and
- 0-10% by weight other additives commonly used in the plastics industry.

In one embodiment, the components of the polymer blend according to the present invention are as follows:
- 82-87% by weight film waste
- 3% by weight maleic acid anhydride, and
- 10-15% by weight PP EPDM blend.

In one embodiment, the components of the polymer blend according to the present invention are as follows:
- 74-91% by weight film waste,
- 3% by weight maleic acid anhydride,
- 5-20% by weight compatibilizing polymer, more specifically PP EPDM elastomer, ethylene butyl acrylate or ethylene vinyl acetate copolymer, and
- 1-3% by weight other additives commonly used in the plastics industry.

In one embodiment, the components of the polymer blend according to the present invention are as follows:
- 87-96 of % by weight film waste,
- 0-3% by weight cross-linked pre-preg,
- 3% by weight maleic acid anhydride,
- 1-7% by weight fiber reinforced plastic grinds, and
- 0-10% by weight other additives commonly used in the plastics industry.

In one embodiment, the components of the polymer blend according to the present invention are as follows:
- 86-92% by weight film waste,
- 0-3% by weight cross-linked pre-preg,
- 3% by weight maleic acid anhydride,
- 2-10% by weight compatibilizing polymer, particularly ethylene butyl acrylate or ethylene vinyl acetate copolymer, and
- 1-7% by weight other additives commonly used in the plastics industry.

In one embodiment, the components of the polymer blend according to the present invention are as follows:
- 68-76% by weight film waste,
- 0-3% by weight cross-linked pre-preg,
- 3% by weight maleic acid anhydride,
- 8-20% by weight compatibilizing polymer, particularly 8-12% PP EPDM elastomer or 15-20% ethylene butyl acrylate or ethylene vinyl acetate copolymer, and
- 6-9% by weight other additives commonly used in the plastics industry.

The present invention also relates to a process for the preparation of homogenous polymer agglomerate. In this process polyamide, polyolefin, glass fiber reinforced plastic and/or resin and a small molecular compatibilizing additive as components, and optionally compatibilizing polymers and/or property-modifying polymers as optional components, and optionally other additives commonly used in plastics industry are converted into homogenous polymer agglomerate at a constant temperature falling in the range of 130-170° C.

An embodiment of the process according to the invention is schematically presented in FIG. 1. In this process waste film or a mixture of waste films, grinds of fiber reinforced plastic waste and/or fiber reinforced resin waste, and optionally one or more of the other polymers listed are introduced in pre-crushing unit 1 and pre-crushing is performed, and the pre-crushed materials are homogenized with agitator blades 2, then they are transferred to agglomerating chamber 5 by the force of conveying screw 4, which is driven by motor 3, at feeder connecting site 6 gravimetric or volumetric feeder 7 is connected to said conveying screw 4, from said feeder 7 the other components listed are added to the pre-crushed materials, said agglomerating chamber 5 contains film chopper disks 8, which are friction disks rotating reversely, the frictional and shearing forces between the disks heat the material mixture introduced by force, in agglomerating chamber 5 a constant temperature of about 150° C. is maintained by using water cooling, at this temperature the introduced materials partially melt, shrink, and at the end of the process the polymer agglomerate is obtained as outlet product 9 in the form of constant-quality homogenous disperse material.

In one embodiment of the process according to the invention the polyamide and polyolefin components are used in the form of waste granules, e.g. waste film granules, preferably in the form of co-extruded waste film granules; and the fiber reinforced plastic and/or resin components are in the form of waste SMC grinds and/or pre-preg; the small molecular compatibilizing additive component is a dicarboxylic acid anhydride, preferably maleic acid anhydride; the compatibilizing polymer component is a thermoplastic material chosen from the group comprising PP EPDM elastomers, ethylene butyl acrylate copolimers and ethylene vinyl acetate copolymers, it is preferably a PP EPDM elastomer; the property-modifying polymer component is e.g. a polyolefin, e.g. polyethylene or EPDM or TPU; and the other additive components commonly used in plastics industry are e.g. colorants, flow-improving additives, antistatics, blowing agents, calcium carbonate, talc or silica.

In one embodiment, the main component used in the process according to the invention is a co-extruded film waste containing 40-49% by weight polyamide,
49-58% by weight polyolefin, and
optionally about 2% by weight EVOH,
and the other components, related to the total weight of components, are
- 1-5 of % by weight small molecular compatibilizing additive,
- 0-10 of % by weight fiber reinforced plastic waste,
- 0-20% by weight compatibilizing polymer and/or property modifier polymer, and
- 0-10% by weight other additives commonly used in the plastics industry.

In one embodiment, the components used in the process according to the invention are as follows:
- 82-87% of film waste
- 3% of maleic acid anhydride, and
- 10-15% of PP EPDM blend.

In one embodiment, the components used in the process according to the invention are as follows:
- 74-91% by weight film waste,
- 3% by weight maleic acid anhydride,
- 5-20% by weight compatibilizing polymer, more specifically PP EPDM elastomer, ethylene butyl acrylate or ethylene vinyl acetate copolymer, and
- 1-3% by weight other additives commonly used in the plastics industry.

In one embodiment, the components used in the process according to the invention are as follows:
- 87-96 of % by weight film waste,
- 0-3% by weight cross-linked pre-preg,
- 3% by weight maleic acid anhydride,
- 1-7% by weight fiber reinforced plastic grinds, and
- 0-10% by weight other additives commonly used in the plastics industry.

In one embodiment, the components used in the process according to the invention are as follows:
- 86-92% by weight film waste,
- 0-3% by weight cross-linked pre-preg,
- 3% by weight maleic acid anhydride,
- 2-10% by weight compatibilizing polymer, particularly ethylene butyl acrylate or ethylene vinyl acetate copolymer, and
- 1-7% by weight other additives commonly used in the plastics industry.

In one embodiment, the components used in the process according to the invention are as follows:
- 68-76% by weight film waste,
- 0-3% by weight cross-linked pre-preg,
- 3% by weight maleic acid anhydride,
- 8-20% by weight compatibilizing polymer, particularly 8-12% PP EPDM elastomer or 15-20% ethylene butyl acrylate or ethylene vinyl acetate copolymer, and
- 6-9% by weight other additives commonly used in the plastics industry.

The invention extends to a homogenous polymer aggregate prepared from the polymer blend according to the invention or from the polymer blend of any of the above embodiments.

Furthermore, the invention extends to a homogenous polymer agglomerate prepared by using any processes according to the invention or any processes of the above embodiments.

Furthermore, the invention includes any products prepared from polymer blends or agglomerates according to the invention or from polymer blends or agglomerates of any of the above embodiments or from the aggregates prepared by using any processes according to the invention or any processes of the above embodiments.

In one embodiment, the above products are e.g. different profiles prepared by injection molding, industrial floor tiles or grass grids, safety mats prepared by blowing technology and used in standing workplaces, anchors, cast films, e.g. flood prevention plastic sheeting, or sheets, e.g. construction shuttering panels, plastic tubes and hoses.

DETAILED DESCRIPTION OF THE INVENTION

In the present invention the terms used in plastics industry are as follows.

A matrix is a thermoplastic material (base polymer), essentially it is a pre-product to which mainly inorganic materials (reinforcing materials and/or additives) are added during processing then the mixture is homogenized.

A composite is an unsaturated thermosetting epoxy or polyester resin which is typically fiber reinforced, e.g. glass fiber reinforced resin. The resin is cross-linked by heat to achieve its final rigidity.

A compound is a thermoplastic reinforced and/or filled plastic (usually in the form of granulates, prepared for further processing), which in addition to matrix, contains property-modifying components which help improve flexibility, flame retardation, UV stability, pigmentation, etc.

Agglomerates are plastic grinds or granules produced in an agglomerating equipment. For example, during the agglomeration of plastic films, the film granules shrink under the influence of heat and convert into particulates which can be easily handled in further processing procedures.

SMC (Sheet Molding Compound) is a fiber reinforced polyester plastic (such as glass fiber or carbon fiber reinforced polyester, vinyl ester or epoxy resin) which is generally processed by extrusion.

A pre-preg is a pre-impregnated glass fiber reinforced composite material comprising a partially cross-linked matrix material (such as epoxy resin or unsaturated polyester). By the cross-linking of pre-preg a fiber reinforced plastic (SMC) is produced. The fiber content of the product is generally 25-27%.

EPDM (ethylene propylene-diene rubber terpolymer) is plastic with excellent oil resistance and UV resistance properties for general use, which is utilized e.g. as an insulating-protecting sheet in the building industry.

PP EPDM TPE is a thermoplastic elastomer, in the production of which, EPDM becomes vulcanized during the polymerization of PP. The resulted elastomer shows excellent properties, such as low-temperature impact strength. Admixing of PP EPDM TPE to the polymer blend or polymer agglomerate according to the invention enhances the flexibility of the matrix, therefore the rigidity of the product decreases.

TPU (thermoplastic polyurethane) is an elastic, transparent, oil, grease and abrasion resistant plastic which is a thermoplastic elastomer comprising a linear block copolymer consisting of hard and soft segments.

In the present description the term "polymer blend" refers all the components used in the production of homogenous polymer agglomerate according to the invention, which components can be introduced in any sequences and in any groupings in the process according to the invention, wherein they interact with each other to form a homogenous polymer aggregate.

Accordingly, the present invention relates to polymer blends and homogenous agglomerates containing polyamide and polyolefin wastes, such as film wastes, preferably co-extruded film wastes and fiber reinforced plastic wastes. The invention also relates to the production of the said polymer blends and homogenous agglomerates. The products prepared from these polymer blends and homogenous agglomerates show excellent properties, which are achieved by the use of a small molecular compatibilizing additive, preferably a dicarboxylic acid anhydride which forms a chemical bond with the polyolefins, and by this they convert into polymers that can be homogenized with polyamides. Furthermore, by establishing dipol-dipol interactions, dicarboxylic acid anhydride binds to the glass fibers having high specific surface area and promotes their dispersion in the forming polymer agglomerate. Consequently, the agglomerate will completely cover the glass fibers, thus producing a smooth product surface with no glass fibers protruding from it. At the same time cross-links are formed in the pre-preg resin and thereby, it also converts into a fiber reinforced plastic. To improve the properties, further components, e.g. compatibilizing polymers and other additives may also be added to the polymer blend or to the process for producing the agglomerate. As a result, homogenous disperse agglomerate or re-granulate with excellent physical-mechanical properties of high value are obtained.

In one embodiment of the invention saturated or unsaturated, optionally substituted dicarboxylic acid anhydride is used as dicarboxylic acid anhydride, such as anhydrides of acids selected from the following group: maleic acid, its alkyl derivatives, such as monomethyl or dimethyl maleic acid, monoethyl or diethyl maleic acid, succinic acid, its alkyl derivatives, or itaconic acid. Preferably, maleic acid anhydride is used.

The process according to the invention is basically aimed at the processing of polyamide and polyolefin wastes, such as films, preferably multilayer films comprising polyamide and polyolefin or their mixture. The film waste usually contains 40-49% by weight polypropylene 49-58% by weight polyamide and about 2% by weight EVOH, and it is usually contaminated with pre-preg or materials of pharmaceutical or food industrial sources. The polymer blend or the agglomerate according to the invention always comprises fiber containing materials. On the one hand, when a film used for packaging pre-preg resins is used, the film contains about 3% of pre-preg as contaminant. On the other hand, fiber-containing plastic waste grinds, SMC or pre-preg may be added to the polymer blend. When processing pharmaceutical or food industrial packaging waste films, fiber containing materials, such as SMC, pre-preg or packaging film contaminated with pre-preg will always be added. In the following examples, films contaminated with pre-preg are used where fiber-containing material is not listed among the components.

In one embodiment of the invention fiber reinforced plastic waste grinds are added as a component. The present inventor experienced that the physical-mechanical properties of the products can be significantly improved by the addition of 1-10% of such grinds. By this a solution is provided for the reuse of difficult-to-manage SMC wastes accumulated all through the years.

In one embodiment of the invention compatibilizing polymers may be used. The use of compatibilizing agents and other additives eliminates the problems arising from the incompatibility of film waste components and from the water absorption of polyamides. According to the inventor's experience, thermoplastic materials, e.g. thermoplastic elastomers, such as PP EPDM, and ethylene butyl acrylate copolimers (EBA) and ethylene vinyl acetate copolymers (EVAC) provide excellent compatibility. These materials ensure compatibility among polymers through secondary bonds. Their further advantage is that their processing temperature is close to that of polyolefins and polyamides. Due to their amorphous structures, they reduce the post-processing deformation of crystalline polyamide and polyolefin by acting also as softening agents. By selecting the proper ratio of polyamide, polyolefin and the said polymer with compatibilizing/softening property, thermoplastic elastomer materials can be produced which can be used well for multi-component injection molding since they are readily welded with polyolefins and with polyamides. For example, by the addition of 5-30% by weight ethylene butyl acrylate copolymer thermoplastic elastomer, base materials with excellent properties can be produced. Their properties are better than those of stryrol butadiene styrol (SBS) or those of styrol ethylene butadiene styrol (SEBS) thermoplastic elasotmers and their high flow indexes provide good processability.

By the addition of PP EPDM TPE as compatibilizing polymer, a soft product with excellent UV resistance and flexibility can be produced.

Other polymers may also be used for the modification of product properties. Polyolefins, such as polypropylene or polyethylene films may also be mixed to the co-extruded film. For example by the admixture of 5-30% of polyethylene, processability can be enhanced and rigidity reduced. The admixture of finely ground waste EPDM rubber also provides softening property. By the admixture of 5-20% of TPU a very durable product with excellent abrasion resistance is provided. Waste materials may also be used as property-modifying polymers.

The polymer blend or aggregate according to the invention may also contain other additives commonly used in the plastics industry. Such additives are e.g. as follows: flow-improving additives, such as polyolefin wax, colourants, antistatic agents, foaming agents, such as azodicarbonamide, and fillers, such as calcium carbonate, silica or talc.

Silica can be used for improving scratch resistance of floor tiles. Silica is a polar material, the incorporation of which may also be promoted by the small molecular compatibilizing additive used according to the invention.

In the process according to the invention the polymer blend components can be introduced together or separately, in any order that is appropriate for the proper implementation of the process according to the invention. Furthermore, any of the components can be previously mixed with any other components or with several other components at the same time, and the components can be introduced into the process in any grouping appropriate to the process.

In a preferred embodiment, the preparation of homogenous polymer agglomerate is performed by using a controlled single-stage continuous dry film agglomeration technology. The compatibilization of polymers and the admixture of additives are thus performed in a single step, that is, the compounding does not require an extra step implying additional heating, which may further damage the degradation-prone polymer components (olefins) which were heated several times during the previous processing. Furthermore, the single-step process also saves energy.

The process is performed at a temperature of 130-170° C., which is lower than the temperature commonly used for processing polymer components. The present process does not require heat transfer since the frictional and shearing forces provide significant heating during the process.

The process according to the invention can be performed in any equipment commonly used in the plastics industry. The process is preferably performed in the equipment shown in FIG. 1. Uniform product composition is ensured by the continuous measurement of the amount of agglomerates prepared during the process and additives are dosed gravimetrically or volumetrically.

The waste film or the mixture of waste films and fiber reinforced resin waste and/or grinds of fiber reinforced plastic waste, and optionally the other polymers listed are introduced in pre-crushing unit 1.

The pre-crushed materials are mixed with agitator blades 2, then they are transferred to agglomerating chamber 5 by the force of conveying screw 4, which is driven by motor 3.

Furthermore, at feeder connecting site 6 gravimetric or volumetric feeder 7 is connected to said conveying screw 4. From said feeder 7 the other polymer components of the polymer blend are added to the pre-crushed materials.

In agglomerating chamber 5 film chopper disks 8 are present, which are friction disks rotating reversely. The frictional and shearing forces between the disks heat the material mixture. The process is performed at a constant temperature of about 150° C., this constant temperature is maintained by using water cooling. At this temperature the introduced materials become partially or completely melted, they shrink and convert into homogenous agglomerate. In the meantime, as it has been described above, in situ cross-linking of the pre-preg resin occurs, and the small molecular compatibilizing additive reacts with the polymers and binds to the fibers through dipol-dipol interaction.

At the end of the process the polymer agglomerate is obtained as outlet product 9 in the form of a constant-quality homogenous disperse agglomerate.

In an extruding device commonly used in the plastics industry the resulting agglomerate is transformed to desired products, e.g. profiles, sheets, floor tiles or safety mats are casted from it.

As a matter of course, newly produced plastics may also be used as components of the polymer blend, agglomerate or product according to the invention, and they are suitable for manufacturing products with similarly high-quality properties, and these products also covered by the scope of protection of the present invention. However, the purpose of the inventor's work was to find a solution to the management of hazardous wastes, therefore recycled waste materials are preferably applied.

In the following examples embodiments of the present invention are described in details, however the invention is not limited to the contents of the examples.

EXAMPLES

Example 1

Base Material for Injection Molding of Different Profiles

Composition:
co-extruded film waste 93%,
SMC grinds 4%,
maleic acid anhydride 3%
The above components are converted into agglomerate at 150° C. in the equipment shown in FIG. 1, and the resulting base material is used for the preparation of different profiles in an extruder.

Example 2

Base Material for Injection Molding of Different Profiles

Composition:
co-extruded film waste 90-96%,
SMC grinds 1-7%,
maleic acid anhydride 3%
The above components are converted into agglomerate at 150° C. in the equipment shown in FIG. 1, and the resulting base material is used for the preparation of different profiles in an extruder.

Example 3

Injection-Molded Plastic Grass Grid

Composition:
SMC grinds 7%
polyolefin wax flow-enhancing additive 3%
maleic acid anhydride 3%
co-extruded waste film 87%
The above components are converted into agglomerate at 150° C. in the equipment shown in FIG. 1, and from the resulting base material grass grids are prepared in the extruder.

Example 4

Injection-Molded Industrial Floor Tiles

Composition:
maleic acid anhydride 3%
3% silica
3% EBA
master blend/coloring/2%
co-extruded film waste 89%
The above components are converted into agglomerate at 150° C. in the equipment shown in FIG. 1, and from the resulting base material floor tiles are casted.

Example 5

Injection-Molded Industrial Floor Tiles

Composition:
maleic acid anhydride 3%
silica 2-4%
EBA or EVAC 2-4%
master blend/coloring/1-3%
co-extruded film waste 86-92%
The above components are converted into agglomerate at 150° C. in the equipment shown in FIG. 1, and from the resulting base material floor tiles are casted.

Example 6

Multicomponent and Multicolour Soft Base Material for Injection-Molding, e.g. Base Material for Industrial Hand Tools Composition:
maleic acid anhydride 3%
EBA 17%
master blend/coloring/2%
co-extruded film waste 78%

The above components are converted into agglomerate at 150° C. in the equipment shown in FIG. 1, and in the extruder, from the resulting base material hand tools are prepared or a soft base material is manufactured for other purposes.

Example 7

Multicomponent and Multicolor Soft Base Material for Injection-Molding, e.g. Base Material for Industrial Hand Tools Composition:
maleic acid anhydride 3%
EVAC 18%
master blend/coloring/2%
co-extruded film waste 77%

The above components are converted into agglomerate at 150° C. in the equipment shown in FIG. 1, and in the extruder, from the resulting base material hand tools are prepared or a soft base material is manufactured for other purposes.

Example 8

Multicomponent and Multicolor Soft Base Material for Injection-Molding, e.g. Base Material for Industrial Hand Tools Composition:
maleic acid anhydride 3%
EBA or EVAC 15-20%
master blend/coloring/1-3%
co-extruded film waste 74-81%

The above components are converted into agglomerate at 150° C. in the equipment shown in FIG. 1, and in the extruder, from the resulting base material hand tools are prepared or a soft base material is manufactured for other purposes.

Example 9

Base Material for Injection-Molding of Anchors of Different Sizes

Composition:
maleic acid anhydride 3%
SMC grinds 5%
co-extruded film waste 92%

The above components are converted into agglomerate at 150° C. in the equipment shown in FIG. 1 then in the extruder, from the resulting injection-molded material anchors of different sizes are prepared.

Example 10

Base Material for Injection-Molding of Anchors of Different Sizes

Composition:
maleic acid anhydride 3%
SMC grinds 3-7%
co-extruded film waste 90-94%

The above components are converted into agglomerate at 150° C. in the equipment shown in FIG. 1 then in the extruder, from the resulting injection-molded material anchors of different sizes are prepared.

Example 11

Injection-Moulded Safety Mat for Electronic Installations

Composition:
maleic acid anhydride 3%
antistatic agent 4%
azodicarbonamide (blowing agent) 4%
PP EPDM mixture 10%
co-extruded film waste 79%

The above components are converted into agglomerate at 150° C. in the equipment shown in FIG. 1, and from the resulting base material safety mats are casted.

Example 12

Injection-Moulded Safety Mat for Electronic Installations

Composition:
maleic acid anhydride 3%
antistatic agent 4%
azodicarbonamide (blowing agent) 3%
EBA 018%
co-extruded film waste 72%

The above components are converted into agglomerate at 150° C. in the equipment shown in FIG. 1, and from the resulting base material safety mats are casted.

Example 13

Injection-Molded Safety Mat for Electronic Installations

Composition:
maleic acid anhydride 3%
antistatic agent 3-5%
physical or chemical blowing agent (typically azodicarbonamide) 3-4%
EBA or EVAC 18% or PP EPDM blend 8-12%
co-extruded film waste 68-76%

The above components are converted into agglomerate at 150° C. in the equipment shown in FIG. 1, and from the resulting base material safety mats are casted.

Example 14

Garden Hose

Composition:
maleic acid anhydride 3%
PP EPDM blend 12%
co-extruded film waste 85%

The above components are converted into agglomerate at 150° C. in the equipment shown in FIG. 1, and from the resulting base material garden hoses are prepared in an extruder.

Example 15

Garden Hose

Composition:
maleic acid anhydride 3%
PP EPDM blend 10-15%
co-extruded film waste 82-87%

The above components are converted into agglomerate at 150° C. in the equipment shown in FIG. 1, and from the resulting base material garden hoses are prepared in an extruder.

Example 16

Base Material for Cast Films

Composition:
maleic acid anhydride 3%
EBA 6%
master blend 2%
co-extruded film waste 89%

The above components are converted into polymer agglomerate at 150° C. in the equipment shown in FIG. 1, and from the agglomerate cast film is extruded.

Example 17

Base Materials for Sheets

Composition:
maleic acid anhydride 3%
EVAC 6%
master blend 2%
co-extruded film waste 89%

The above components are converted into agglomerate at 150° C. in the equipment shown in FIG. 1, and from the agglomerate sheets are casted.

Example 18

Base Materials for Cast Films or Sheets

Composition:
maleic acid anhydride 3%
EBA or EVAC 5-7%
master blend 1-3%
co-extruded film waste 87-91%

The above components are converted into agglomerate at 150° C. in the equipment shown in FIG. 1, and from the agglomerate cast film is extruded or sheets are casted.

Example 19

Highly Elastic Sheets

Composition:
maleic acid anhydride 3%
SMC grinds 6%
calcium carbonate 7%
co-extruded film waste 84%

The above components are converted into agglomerate at 150° C. in the equipment shown in FIG. 1, and from the agglomerate sheets are casted.

Example 20

Highly Elastic Sheets

Composition:
maleic acid anhydride 3%
SMC grinds 5-7%
calcium carbonate or talc 5-10%
co-extruded film waste 80-67%

The above components are converted into agglomerate at 150° C. in the equipment shown in FIG. 1, and from the agglomerate sheets are casted.

Example 21

Injection-Molded Material for Different Profiles

Composition:
polyamide film waste 52%
polypropylene film waste 41%
SMC grinds 4%
maleic acid anhydride 3%

The above components are converted into agglomerate at 150° C. in the equipment shown in FIG. 1, and from the resulting base material different profiles are prepared in an extruder.

Physical-Mechanical Properties of the Material According to the Invention

As it is demonstrated below, the physical-mechanical properties of products prepared from the polymer blend and aggregate according to the invention are close to those of technical plastics.

The Isod notched impact strength of mass-produced plastics is usually below 10 kJ/m2 (ISO 180/A standard), while notch bars produced from the polymer blend or agglomerate according to the invention (e.g. examples 1, 4 and 8) cannot be broken even with the highest weight used in the Isod and Charpy method (ISO 179-1 standard). Furthermore, the values of the ultimate strength limit are also higher by an order of magnitude.

Freeze and heat resistance of the polymer agglomerate according to the invention and the products prepared from them are also particularly good, more specifically these products can be used without their being damaged in the temperature range of −20-+120° C. Furthermore, their electric brake-down strength is high, they can be made antistatic and flame-retardant.

The melt flow index (MFI) value of the product made of a blend containing 3% maleic acid anhydride is at least twice as high as that of the polypropylene homopolymer (measured according to the ISO 1133-1 standard).

The tensile strength, rupture strength and dynamic modulus (at bending) of the product made of a blend containing 3% SMC are by 15-30% higher (measured in accordance with the ISO 178 standard), and the dynamic modulus can be regulated in a broad range by changing the SMC content.

Shore A hardness of the notch bar prepared from a polymer blend containing ethylene butyl acrylate compatibilizer (e.g. examples 4, 6, 12 and 16) is between the values of 30-90 (measured in accordance with the ISO 868 standard). Processability and durability become significantly improved at ethylene butyl acrylate content of around 5% by weight. This allows the use of recycled waste films as thermoplastic elastomers, which represents an advance in the field of plastic waste recycling.

To conclude the above aspects, the process the inventor has developed provides a solution to recycling hazardous plastics industry wastes, more specifically, polyamide and polyolefin film wastes concomitantly with fiber reinforced plastic wastes or with fiber reinforced resin. Polymer blends and agglomerates according to the invention provide base materials for the manufacture of products with high-quality properties.

The invention claimed is:

1. Process for the preparation of uniformly mixed polymer agglomerate, characterized in that
a polyamide component,
a polyolefin component,
a cross-linked glass fiber reinforced plastic component and/or a glass fiber reinforced resin component,
a dicarboxylic acid anhydride compatibilizing additive component, which compatibilizes the aforementioned components,
as optional components, compatibilizing polymers which enhance said compatibilization and/or other property-modifying polymers and
optionally other additives commonly used in plastics industry
are, in a controlled one-step continuous process, mixed and agglomerated at a constant temperature falling in the range of 130-170° C.

2. The process according to claim 1, characterized in that polyamide and polyolefin containing co-extruded waste film or a mixture of waste films of said polymers, grinds of cross-linked glass fiber reinforced plastic waste and/or glass fiber reinforced resin, and optionally compatibilizing polymers and other property modifying polymers are introduced in a pre-crushing unit (1) and pre-crushing is performed, and the pre-crushed materials are homogenized with agitator blades (2), then they are transferred to an agglomerating chamber (5) by the force of a conveying screw (4), which is driven by a motor (3), at a feeder connecting site (6), a gravimetric or volumetric feeder (7) is connected to said conveying screw (4), from said feeder (7) dicarboxylic acid anhydride compatibilizing additive and optionally compatibilizing polymers and/or other property modifying polymers and/or other additives commonly used in plastic industry are added to the pre-crushed materials, said agglomerating chamber (5) contains chopper disks (8), which are friction disks rotating reversely, the frictional and shearing forces between the disks heat the material mixture introduced by force, in the agglomerating chamber (5) a constant temperature of about 150° C. is maintained by using water cooling, at this temperature the introduced materials partially melt, shrink, and transform to uniformly mixed polymer agglomerate, and at the end of the process the polymer agglomerate is obtained as an outlet product (9) in the form of constant-quality uniformly mixed polymer agglomerate.

3. The process according to claim 1, wherein the polyamide and polyolefin components are in the form of waste film granules or co-extruded waste film granules; the cross-linked glass fiber reinforced plastic component is in the form of grinds of cross-linked sheet molding compound waste; the glass fiber reinforced resin component is in the form of pre-preg waste; the dicarboxylic acid anhydride compatibilizing additive component is maleic acid anhydride; the compatibilizing polymer component is a thermoplastic material selected from the group consisting of an elastomer of polypropylene and ethylene propylene-diene rubber terpolymer, ethylene butyl acrylate copolymers and ethylene vinyl acetate copolymers; the property-modifying polymer component is ethylene propylene-diene rubber terpolymer or thermoplastic polyurethane; and the other additive components commonly used in plastics industry are selected from the group consisting of colorants, flow-improving additives, antistatics, blowing agents, calcium carbonate, talc and silica.

4. The process according to claim 1, wherein the weight percentages of the starting components, based on the total weight of the components, are as follows:

55-99% by weight of co-extruded film waste, which contains, based on the total weight of the co-extruded film waste:
40-49% by weight polyamide,
49-58% by weight polyolefin,
up to 2% by weight ethylene vinyl alcohol, and
optionally about 3% by weight pre-preg as contaminant;
1-5% by weight dicarboxylic acid anhydride compatibilizing additive;
up to 10% by weight of cross-linked glass fiber reinforced plastic and/or glass fiber reinforced resin;
0-20% by weight of compatibilizing polymer and/or other property modifier polymer; and
0-10% by weight of other additives commonly used in the plastics industry.

5. The process according to claim 1, wherein the weight percentages of the starting components, based on the total weight of the components, are as follows:
a) 82-87% by weight of wastes of polyolefin and polyamide films contaminated with pre-preg,
3% by weight maleic acid anhydride, and
10-15% by weight of a blend of polypropylene and ethylene propylene-diene rubber terpolymer; or
b) 74-91% by weight of wastes of polyolefin and polyamide films contaminated with pre-preg,
3% by weight maleic acid anhydride, and
5-20% by weight of an elastomer of polypropylene and ethylene propylene-diene rubber terpolymer, or ethylene butyl acrylate, or ethylene vinyl acetate, and
1-3% by weight other additives commonly used in the plastics industry; or
c) 87-96% by weight of wastes of polyolefin and polyamide films,
0-3% by weight pre-preg,
3% by weight maleic acid anhydride,
1-7% by weight of grinds of cross-linked glass fiber reinforced plastic, and
0-10% by weight other additives commonly used in plastics industry; or
d) 86-92% by weight of wastes of polyolefin and polyamide films,
an amount up to 3% by weight pre-preg,
3% by weight maleic acid anhydride,
2-10% by weight ethylene butyl acrylate copolymer or ethylene vinyl acetate copolymer, and
1-7% by weight other additives commonly used in the plastics industry; or
e) 68-76% by weight of wastes of polyolefin and polyamide films,
an amount up to 3% by weight pre-preg,
3% by weight maleic acid anhydride,
8-12% by weight of an elastomer of polypropylene and ethylene propylene-diene rubber terpolymer, and
6-9% by weight other additives commonly used in the plastics industry; or
f) 68-76% by weight wastes of polyolefin and polyamide films,
an amount up to 3% by weight cross linked pre-preg,
3% by weight maleic acid anhydride,
15-20% by weight of ethylene butyl acrylate copolymer or ethylene vinyl acetate copolymer, and
6-9% by weight other additives commonly used in the plastics industry.

* * * * *